Dec. 8, 1959  H. L. LEVIN  2,916,649
ELECTRON GUN STRUCTURE
Filed June 12, 1957  3 Sheets-Sheet 1

Inventor
HERBERT L. LEVIN
By Alfred C. Hill
Agent

Dec. 8, 1959 H. L. LEVIN 2,916,649
ELECTRON GUN STRUCTURE
Filed June 12, 1957 3 Sheets-Sheet 2

Inventor
HERBERT L. LEVIN
By Alfred C. Hill
Agent

Dec. 8, 1959 H. L. LEVIN 2,916,649
ELECTRON GUN STRUCTURE
Filed June 12, 1957 3 Sheets-Sheet 3

Inventor
HERBERT L. LEVIN
By Alfred C. Hill
Agent

United States Patent Office

2,916,649
Patented Dec. 8, 1959

2,916,649

ELECTRON GUN STRUCTURE

Herbert L. Levin, Paterson, N.J., assignor to International Telephone and Telegraph Corporation, Nutley, N.J., a corporation of Maryland Application June 12, 1957, Serial No. 665,164

9 Claims. (Cl. 313—250)

This invention relates to electron gun structures and more particularly to improvements in electrode mounting in electron gun structures.

Electron discharge devices in the nature of traveling wave tubes and the like have electron gun structures which must be accurately positioned within the tube housing with respect to the center line of the magnetic field associated therewith. Further, the electrodes which go to make up the electron gun must be accurately positioned with respect to each other, not only when assembled, but when the tube is in operation. Failure to maintain these accuracies produces faulty operation of the tube with its inherent distortion and shortened life.

The problem of supporting electrodes in precise geometric relation within an electron discharge device is often quite severe. The difficulty arises from the fact that such electrodes must be insulated from each other and yet preferably mounted to insure a fixed spacial relationship. To achieve geometric precision, it is desirable that the electrodes be tied together in some fashion, it being virtually impossible to maintain a fixed spacial relationship between independently mounted electrodes.

Various schemes have been employed in the past to mount the electrodes to form electron gun structures. Each of these schemes has had one or more disadvantages. For instance, spaced recesses have been drilled through the electrodes to provide seating surfaces for insulating spheres to seat therein and align the electrodes, these spheres and recesses being in axial alignment provide voids which entrap gases and thus present an outgassing problem. These voids must be vented in order to avoid entrapment of gases behind the spheres. Such vent holes involve additional machining and are difficult to clean and inspect. Further electrodes of these prior art arrangements are relatively massive plates which act as gas reservoirs continually giving off gases into the vacuum space. This arrangement and size of electrodes is suitable for devices on continuous exhaust but, where the electron device is a sealed vacuum unit, the massive electrodes will give off sufficient gas to poison the tube. In addition to giving off unwanted gases, the massive electrodes add weight to the tube and also increase the length of the tube.

Therefore, it is an object of this invention to provide an improved electron gun structure for an electron discharge device.

Another object of this invention is to provide an improved electron gun structure for an electron discharge device so arranged as to enable easy outgassing of the recesses employed to position the electrodes of the gun structure.

Still another object of this invention is to provide an improved gun structure for an electron discharge device which is easily outgassed and where the electrode support elements are fashioned from relatively thin sheet metal to reduce the reservoir of unwanted gases which might poison the discharge device.

Other objects of this invention are to provide an improved support for electron gun electrodes; to provide electron gun supports which are compact, easily fabricated, and rugged; to provide electron gun supports which maintain critical alignment and spacing of the gun electrodes relative to each other and a rectilinear electron beam path; to provide an electron gun support void of cements and brazing materials for supporting the gun elements; to eliminate gas entrapping voids; and to provide an electron gun support for reducing the electron gun size.

A feature of this invention is the provision of means for holding the electrodes of an electron gun in fixed geometric relation which comprises a plurality of spaced coacting aligned recesses in opposing surfaces of adjacent ones of said electrodes, the recesses in opposite surfaces of each of said electrodes being in an offset relation with respect to each other, a plurality of insulating spacers disposed between adjacent electrodes and seating in said coacting aligned recesses and means to retain the coacting recesses of said electrodes in engagement with said spacers.

Another feature of this invention is the utilization of sheet-like elements, certain ones of which carry electron gun electrodes for predetermined location with respect to a given axis as the building blocks for the electron gun structure. Each of the sheet-like elements includes a first plurality of indexing recesses in one surface thereof and a second plurality of indexing recesses in the other surface thereof offset with respect to said first recesses. One of the sheet-like elements is positioned perpendicular to the given axis and the groups of indexing recesses on opposing surfaces of adjacent elements are placed in alignment and an insulating member is disposed to engage each of the aligned recesses to space said elements in aligned relation with respect to said given axis to thereby locate and align said electrodes axially and radially. Means are further provided which coact with the other end of the structure to retain said recesses in engagement with said members.

Still another feature of this invention is the provision of ceramic spacers between adjacent electrodes having various configurations which in coacting relation with various configurations of the recesses act to automatically align the electrodes or the elements carrying the electrodes. The ceramic spacers may be in the form of a sphere; a member having spherical end portions; a double ended cone, or a double ended pyramid having three or four sides as the situation dictates. The recesses may take the form of a square, a circle, a triangle, a channel or raceway having dimples therein to provide a recess, or a channel arrangement dimensioned to engage portions of the ceramic spacer for the desired alignment.

A further feature of this invention is the provision of a resilient compressive means included as a portion of the means to retain the coacting recesses of said electrodes in engagement with said spacers and thereby protect the electron gun structure against shock, vibration, unequal thermal expansions, and so forth.

The above-mentioned and other features and objects of this invention will become more apparent by reference to the following description taken in conjunction with the accompanying drawings, in which.

Figure 2:
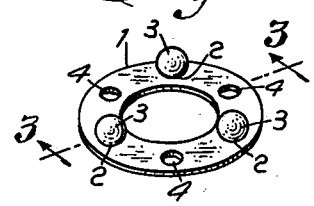
Fig. 2 is a perspective view of one support element and one group of spacers cooperating in accordance with the principles of this invention to form the electron gun of Fig. 1.
Figure 13:
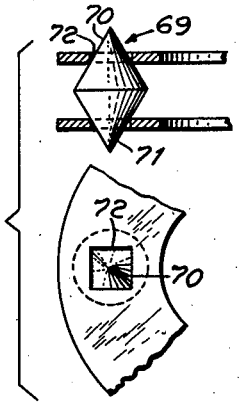
Figure 14:
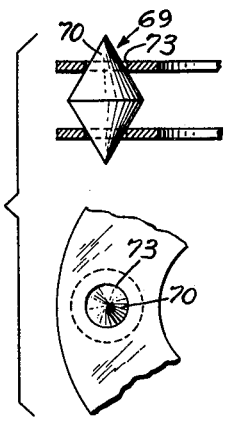
Figure 16:
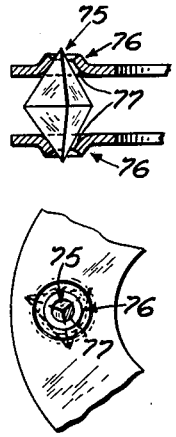
Figure 15:
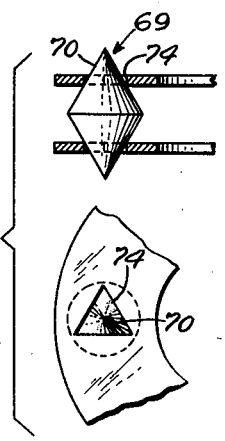
Figure 17:
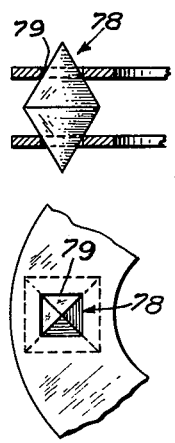
Figure 18:
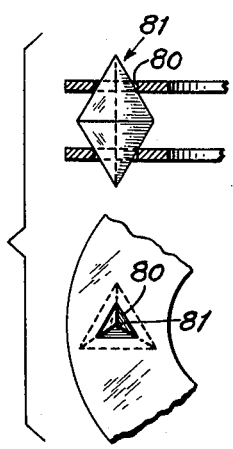

Figs. 13, 14 and 15 illustrate in fragmentary plan and cross-sectional views various embodiments of the recesses cooperating with double-conical type spacers capable of being employed in the structure of Fig. 2; and Figs. 16, 17 and 18 illustrate in fragmentary plan and cross-sectional views various embodiments of recesses co-operating with double-pyramid type spacers capable of being employed in the structure of Fig. 2.

Figure 1:
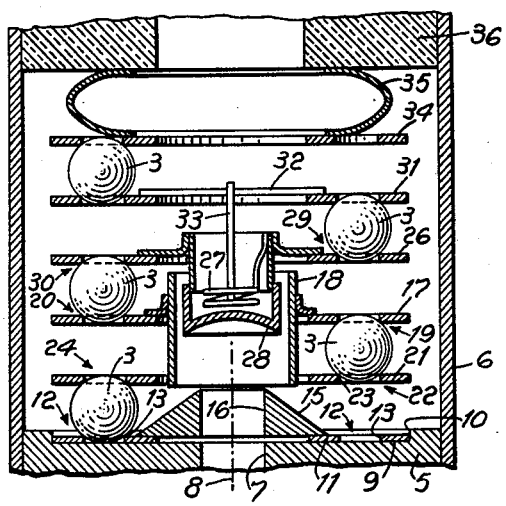
Fig. 1 is a longitudinal cross-sectional view of an electron gun following the principles of this invention.

Referring to Fig. 1, there is disclosed therein a cross-sectional view of an electron gun structure composed of a plurality of the building blocks each of which are substantially as illustrated in Fig. 2. These building blocks in accordance with this invention of means for holding electrodes in fixed geometric relationship provide a stacked electron gun structure whereby electrodes of the electron gun structure are positioned axially and radially. The building blocks of Fig. 2 include support element 1 having in the upper surface thereof a plurality of recesses 2 shown in the form of holes providing a seating surface for spacers 3 composed of insulating material and in the form of spheres. In the lower surface of element 1 is provided a second plurality of seating surfaces provided by recesses 4 in the form of circular holes to engage insulating spacers positioned in the lower adjacent element. Recesses 2 and 4 are in an offset relationship with each other so that the spacers of a stacked electron gun arrangement are not positioned at opposite ends of the same aperture of an element 1 and thereby eliminate the entrapment of gases in the recesses. The electron gun structure of Fig. 1 comprises a seating member or reference member 5 positioned transversely of a housing member 6 which may be the vacuum enclosure. Centrally of member 5 is disposed an aperture 7 coaxial with the desired rectilinear beam path or axis 8 and through which the electron beam is projected from the electron gun structure. Member 5 may be provided with a seating surface 9 having a lip portion 10 thereon to properly position a sheet-like element 11 having at least a plurality of recesses 12 in the form of apertures 13 on the upper surface of element 11 to provide a seat for dielectric spacers 3 shown in this instance to be spherical. Element 11 carries thereon the anode 15 of the electron gun whose central aperture 16 is in a predetermined coaxial arrangement with axis 8. From this starting point, it is possible to stack other building blocks of the electron gun structure as shown in Fig. 2 to provide an electron gun having a plurality of electrodes which are properly located axially and radially with respect to axis 8 and with respect to each other.

An alternative arrangement would be to provide base member 5 with appropriately positioned recesses 12 in the upper surface thereof to engage the spacers 3 to act as the start of the stacked electrode arrangement eliminating the element 11. The anode 15 would be secured to or formed in the upper surface member 5 in proper geometric relationship with axis 8.

Element 17 has secured thereto focus electrode 18 such as by brazing, spot welding, or other securing means, and includes on the lower surface thereof recesses 19 to provide a seating surface for spacers 3 and on the upper surface thereof recesses 20 to provide a seating surface for spacers 3. To properly space focusing electrode 18 with respect to anode 15 along axis 18 there is disposed a support element 21 intermediate element 11 and 17 having a plurality of recesses 22 in the form of holes 23 to provide a seating surface on the upper surface of element 21 and recesses 24 in the form of apertures 25 to provide a seating surface in the lower surface of element 21 to receive spacers 3. Recesses 12 and 24 in opposing surfaces of adjacent support elements 11 and 21 are in an aligned coacting relationship to engage spacers 3 to properly position element 21 axially and radially with respect to axis 8. Recesses 22 on the opposite surface of element 21 from recesses 24 are in coacting axial alignment with recesses 19 in the opposing surface of element 17 and are thereby enabled to engage spacer 3 to properly align radially and axially the element 17 and hence the electrode 18. Support element 26 carrying filament 27 and cathode 28 includes on the upper surface thereof recesses 29 and on the lower surface thereof a plurality of recesses 30, each of these recesses also being in the form of circular apertures. Recesses 20 and 30 are aligned in a coacting relationship to engage spacers 3 to thereby position element 26 and hence filament 27 and cathode 28 in the proper fixed geometric relationship with respect to the other electrodes and the axis 8. Support element 31 also includes a plurality of offset recesses in the opposite surfaces thereof carries a member 32 to support the axially disposed filament lead 33. The recesses on opposing surfaces of elements 26 and 31 are in coacting aligned relationship and are employed to engage through the recesses and spacers 3 another element 34 which may be included in the means to retain the coacting recesses in engagement with spacers 3. The retaining means includes a spring 35 bearing against element 34 and a member 36 which may be the stem of the electron tube in coacting structural relationship with housing 6. The resilient compressive means or spring 35 bears against element 34 and thereby places a compressive force between the coacting recesses and the spacers 3 and hence against the base member 5 to maintain the electrodes in a fixed geometric relationship with respect to each other and to the central axis 8.

Spacers 3 which are illustrated to be spherical in configuration, are necessarily insulating material to provide the proper insulating between the metallic elements, certain ones of which carry the electrodes of the electron discharge device gun. Spacers 3 preferably are accurately ground ceramic spheres which have a diameter larger than the recesses with which they coact and are commercially available in alumina, synthetic sapphire, and similar ceramic materials with very close tolerances and at low cost. The recesses, shown in Figs. 1, 2 and 3 to be circular apertures, must have a diameter which is uniform, and must be so positioned on the elements that adjacent elements may be aligned to provide the desired geometric relationship therebetween. The recesses may be formed by drilling, stamping, and/or dies. As pointed out hereinabove, the support elements of the electron gun carry the various gun components or electrodes such as the cathode, focus cup, anode, and so forth, but it must be remembered that these gun components may be formed as the integral part of the support elements and, therefore, the support elements themselves, due to their metallic nature, are electrodes.

Figure 3:
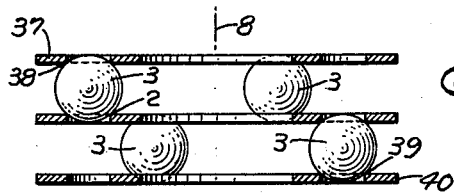
Fig. 3 is a fragmentary cross-sectional view similar to Fig. 1 but taken as shown by line 3—3 of Fig. 2 illustrating the coacting relation between recesses of adjacent electrodes and spherical spacers.

It can be observed from the illustrations in Figs. 2 and 3 that the insulating spacers between adjacent electrodes or support elements are not in axial alignment but are in an offset relationship such that there is no entrapment of gas in the voids formed by the apertures which provide the seating recesses where the spacers occupy both ends of a hole through an electrode element. It will be further noted that the material from which the support elements are formed have a thickness which will not permit the spherical spacers from occupying the same aperture each on opposite surfaces of the element. As pointed out hereinabove, the thin characteristic of the metallic elements within the electron gun structure is important where the electron discharge device is permanently sealed since metallic components of substantial thickness act as gas reservoirs which could poison the discharge device upon escape thereof.

Referring to Fig. 3, there is disclosed therein the coacting relationship between support element 1 and adjacent support element 37. As pointed out in Fig. 2, recesses 2, circular in configuration, receives and seats spherical insulating spacers 3 which in cooperation with the coacting recess 38 of element 37 positions these elements in a fixed geometric relationship with each other and the axis 8. The bottom surface of member 1 includes therein a plurality of recesses 4 in an offset relationship with respect to recesses 2 such that it may be in coacting aligned relationship with a recess 39 of adjacent member 40 to thereby align and locate member 40 with respect to the elements 1 and 37 and the axis 8. This illustration shows the offset relationship between the recesses on opposite surfaces of a support element, their coacting aligned relationship with the recesses in the opposing surfaces of adjacent support elements and their engagement with the spacers 3.

Figure 4:
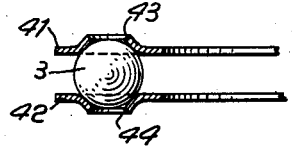
Figs. 4 and 5 illustrate fragmentary cross-sectional views of embodiments of the recess arrangements capable of being employed in the structure of Fig. 2.
Figure 5:
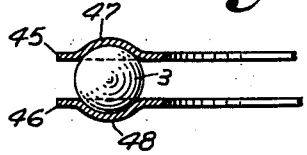

Figs. 4 and 5 illustrate other circular recess configurations which can cooperate with spherical spacers 3 to provide the desired fixed geometric relationship between gun electrodes carried by support elements. In Fig. 4 the support elements 41 and 42 respectively include counterbore recesses 43 and 44, while in Fig. 5, the elements 45 and 46 each include aligned coacting recesses 47 and 48, respectively of a dimple or depression configuration to engage in a complementary manner a spherical portion of spherical spacers 3.

Figure 6:
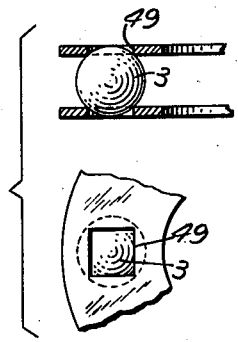
Figs. 6, 7, 8 and 9 are fragmentary standard cross-sectional views of various embodiments of recesses co-operating with spherical spacing members capable of being employed in the structure of Fig. 2.
Figure 7:
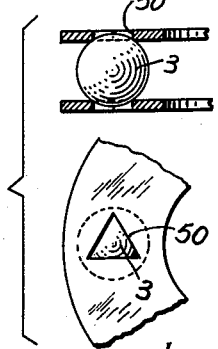

The recesses which engage the spherical spacers 3 are not necessarily limited to a circular configuration whether dimpled or counterbored or just a plain aperture but may include a rectangular recess 49, as illustrated in Fig. 6, or a triangular configuration 50, as shown in Fig. 7. Each of these polygon shaped recesses provide a seating surface for the spherical spacers 3 in adjacent support elements.

Figure 8:
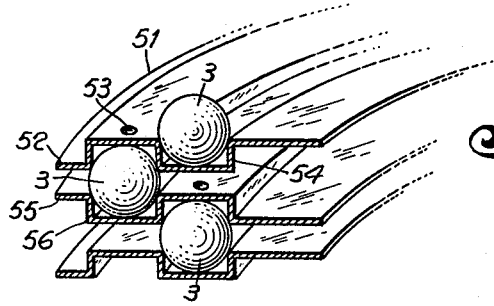

Fig. 8 illustrates still another embodiment to enable the stacking of electron gun electrodes in accordance with this invention. A raceway 51 may be provided about the periphery of the support element shaped to form a recess on one surface of element 52 and including therein dimples 53 disposed on each side of spacer 3 to provide the desired recess for locking the spacers 3 in its proper location. An inverse raceway 54 opened to the other surface of electrode 52 is arranged with dimples, such as dimples 53, to provide a recess for spacer 3 to position in a fixed geometric relation an electrode element above that of element 52. A positioning lock is maintained between element 52 and element 55 for positioning thereof by means of spheres 3 engaging a recess formed by raceway 51 and dimples 53 and a recess formed raceway 56 and dimples similar to dimples 53. This arrangement of oppositely disposed raceways may be continued from element to element as depicted in Fig. 8 to properly stack and align axially and radially the electrode elements or axial spacing elements to provide a complete electron gun structure as illustrated in Fig. 2. This raceway in the support elements would mechanically stiffen the thin sheet-like material.

Figure 9:
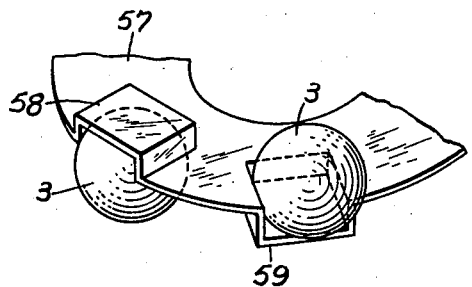

Fig. 9 discloses an alternative arrangement of Fig. 8, which includes in a support element 57 a downwardly disposed closed channel 58 for engagement of spacers 3 and an upwardly disposed closed channel 59 containing offset spacer 3. Channels 58 and 59 are in an offset relationship and provide the offset recesses in the opposite surfaces of element 57 as called for in the other configurations illustrated herein. By properly matching and aligning the coacting recesses of adjacent elements and utilizing the inner surface of shell 6 (Fig. 2), it is possible to also stack the elements to provide an electron gun arrangement whereby certain of the elements, such as element 57, carry the gun electrodes.

The description hereinabove has set forth the principles of this invention including various configurations of recesses in cooperation with spherical insulating spacers. It is to be understood that other space and recess configurations may be employed to obtain the objects and features of this invention.

Figure 10:
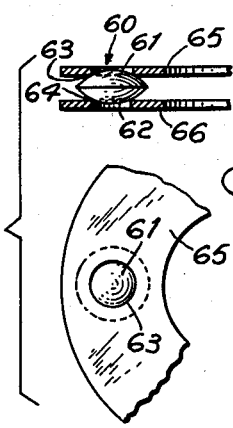
Figs. 10, 11 and 12 illustrate in fragmentary plan and cross-sectional views various embodiments of recesses cooperating with spacing members having spherical end portions capable of being employed in the structure of Fig. 2.
Figure 11:
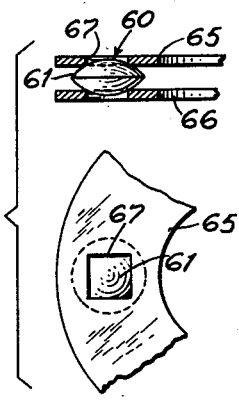
Figure 12:
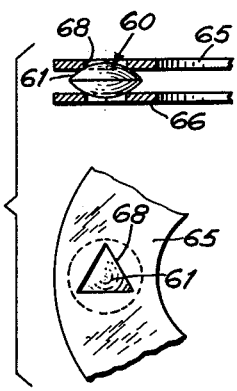

Figs. 10, 11 and 12 illustrate still another configuration which the dielectric spacers may take and are identified as spacers 60 having spherical end portions 61 and 62 positioned to engage the coating recesses of adjacent elements 65 and 66. Fig. 10 illustrates spacers 60 engaged in circular coacting recesses 63 and 64. Fig. 11 illustrates the employment of spacer 60 in conjunction with rectangular recesses 67, preferably a regular rectangle. Fig. 12 illustrates the employment of spacer 60 in conjunction with triangular recesses 68. Spacer 60 having spherical end portions 61 and 62 is shown to be elliptical in nature in cross-section, but it is to be understood that the end portions 61 and 62 is shown to be elliptical in nature in cross-section, but it is to be understood that the end portions 61 and 62 could be separated by a cylinder of given length to increase the spacing between the adjacent elements if so desired.

Figs. 13, 14 and 15 illustrate still another dielectric spacer element of different configuration. Dielectric spacer 69 has a double conical configuration whereby the apex portions 70 and 71 will engage coacting aligned recesses in adjacent elements of obvious forms. Fig. 13 illustrates spacer 69 in cooperation with square recesses 72, Fig. 14 illustrates spacer 69 engaged in a recess 73 of circular configuration and Fig. 15 illustrates spacer 69 engaged in recess 74 of triangular configuration.

Figs. 16, 17 and 18 each illustrate still another insulating spaced having a double pyramid configuration in coacting relationship with recesses in adjacent support elements of various configuration. Fig. 16 specifically illustrates a three-sided pyramid 75 in coacting relationship with a recess 76 having an embossed portion 77 thereon wherein the embossed portion 77 provides a line contact between a portion of each of the sides of the pyramid type dielectric spacer element. Fig. 17 illustrates a four-sided double pyramid spacer 78 cooperating with a square recess 79 such that the sides of the double pyramid 77 engages the side walls of the recess 79. Recess 79 may be considered complementary to the end portion of spacer 78. Where a triangular recess 80 is employed, a three-sided pyramid spacer 81 may be employed such that the sides of the pyramids will engage the recess 80. Recess 80 may be considered complementary to the end portion of spacer 78.

The combination of certain forms of spacers and certain forms of recesses will provide at least a three-point engagement, such as between a spherical spacer and a triangular recess. Other combinations of spacers and recesses will provide engagement about the periphery of a plane through the spacer such as between a circular recess and a spherical spacer. Still other combinations of recesses and spacers will fall between the above extremes.

In the ensuing description, there has been described a plurality of dielectric spacer members having different configurations cooperating with recesses in adjacent electrode members in a coacting, sometimes complementary, relationship to provide the desired geometric relationship between electrodes of an electron gun structure. It is to be understood that the configurations of spacers and recesses are not exhausted and that there are numerous other arrangements such as providing on the support elements other elements which will lock the spheres in a recess-type affair against an outer shell and other channeling arrangements of the electrode support elements other than those shown in Figs. 8 and 9.

While I have described above the principles of my invention in connection with specific apparatus, it is to be clearly understood that this description is made only by way of example and not as a limitation to the scope of my invention as set forth in the objects thereof and in the accompanying claims.

I claim:

1. In a vacuum tube having a plurality of electrodes, means for holding the electrodes in fixed geometric relationship comprising a plurality of spaced coacting aligned recesses in opposing surfaces of adjacent ones of said electrodes, the recesses in opposite surfaces of each of said electrodes being in an offset relation with respect to each other, a plurality of insulating spacers disposed between adjacent electrodes and seating in said coacting aligned recesses and means to retain the coacting recesses of said electrodes in engagement with said spacers.

2. A vacuum tube according to claim 1, wherein said spacers are spheres and said recesses engage at least three points on the surface of said spheres.

3. A vacuum tube according to claim 1, wherein said spacers are spheres and said recesses have a circular seating surface for said spheres.

4. A vacuum tube according to claim 1, wherein said spacers are spheres and said recesses are circular apertures of smaller diameter than said spheres.

5. A vacuum tube according to claim 1, wherein said retaining means includes a resilient compressive means in coacting relationship with at least one of said electrodes and a fixed member of said vacuum tube.

6. An electron gun structure for projecting an electron beam along a given rectilinear beam path comprising a member disposed perpendicular to said beam path having an aperture coaxial of said beam path for electron beam passage therethrough and a plurality of spaced circular recesses spaced from said aperture, a plurality of conductive sheet-like elements perpendicular to said beam path having a first plurality of spaced circular indexing recesses in one surface thereof and a second plurality of spaced circular indexing recesses in the other surface thereof offset with respect to said first recesses, the recesses of opposing surfaces of adjacent ones of said elements being in coacting alignment and the recesses of one of said elements and the recesses of said member being in coacting alignment, electron gun electrodes carried by certain of said elements and said member in predetermined location with respect to said beam path, a plurality of spherical insulating spacers, one of said insulating spacers being disposed to engage each of said coacting recesses to space said elements in aligned relation with respect to said beam path to thereby locate and align said electrodes axially and radially and means coacting with one of said elements to retain said recesses in engagement with said spacer.

7. An electron gun structure for projecting an electron beam along a given rectilinear beam path comprising a conductive member disposed perpendicular to said beam path having an aperture coaxial of said beam path for electron beam passage therethrough and a seating surface, a plurality of conductive sheet-like elements perpendicular to said beam path certain ones of which carry electron gun electrodes for predetermined location with respect to said beam path, each of said elements including a first plurality of circular indexing recesses in one surface thereof and the intermediate ones of said elements further include a second plurality of circular indexing recesses in the other surface thereof offset with respect to said first recesses, the recesses of opposing surfaces of adjacent ones of said elements being in coacting alignment, one of said elements being seated in said seating surface having its indexing recesses in coacting alignment with the recesses of the next adjacent element, a plurality of spherical insulating spacers, one of said insulating spacers being disposed to engage each of said coacting recesses to space said elements in aligned relation with respect to said beam path to thereby locate and align said electrodes axially and radially and means including a resilient compressive member coacting with one of said elements to retain said recesses in engagement with said spacers.

8. An electron gun structure comprising a plurality of sheet-like annular elements certain ones of which carry electron gun electrodes for predetermined location with respect to a given axis, each of said elements including a first plurality of indexing recesses on one surface thereof adjacent the periphery thereof and a second plurality of indexing recesses on the other surface adjacent the periphery thereof interposed between said first recesses, the recesses of opposing surfaces of adjacent ones of said elements being in coacting alignment, means to position one of said elements at one end of said structure perpendicular to said given axis, a plurality of insulating members, one of said insulating members being disposed to engage each of said coacting recesses to locate and align said electrodes axially and radially and means coacting with the other end of said structure to retain said coacting recesses in engagement with said members.

9. An electron gun structure comprising a plurality of sheet-like annular elements certain ones of which carry electron gun electrodes for predetermined location with respect to a given axis, each of said elements including a first plurality of circular indexing recesses on one surface thereof adjacent the periphery thereof and a second plurality of circular indexing recesses on the other surface adjacent the periphery thereof interposed between said first recesses, the recesses of opposing surfaces of adjacent ones of said elements being in coacting alignment, means to position one of said elements at one end of said structure perpendicular to said given axis, a plurality of spherical insulating members one of said insulating members being disposed to engage each of said coacting recesses to locate and align said electrodes axially and radially and means including resilient compressive means coacting with the other end of said structure to retain said coacting recesses in engagement with said members.

References Cited in the file of this patent

UNITED STATES PATENTS

| Number | Name | Date |
|---|---|---|
| 2,324,108 | Pyk | July 13, 1943 |
| 2,581,446 | Robinson | Jan. 8, 1952 |
| 2,782,337 | Robinson | Feb. 19, 1957 |